United States Patent
Moon et al.

(10) Patent No.: US 9,586,578 B2
(45) Date of Patent: Mar. 7, 2017

(54) METHOD FOR LEARNING TOUCH POINT OF ENGINE CLUTCH FOR HYBRID ELECTRIC VEHICLE

(71) Applicant: HYUNDAI MOTOR COMPANY, Seoul (KR)

(72) Inventors: Seong Wook Moon, Seoul (KR); Song Il Park, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/934,099

(22) Filed: Nov. 5, 2015

(65) Prior Publication Data

US 2016/0339902 A1   Nov. 24, 2016

(30) Foreign Application Priority Data

May 19, 2015 (KR) .................. 10-2015-0069409

(51) Int. Cl.

| | |
|---|---|
| *B60W 10/02* | (2006.01) |
| *F16D 48/08* | (2006.01) |
| *B60K 6/26* | (2007.10) |
| *B60K 6/387* | (2007.10) |
| *B60K 6/442* | (2007.10) |

(Continued)

(52) U.S. Cl.
CPC .............. *B60W 20/13* (2016.01); *B60K 6/26* (2013.01); *B60K 6/387* (2013.01); *B60K 6/442* (2013.01); *B60W 10/02* (2013.01); *B60W 10/06* (2013.01); *B60W 10/08* (2013.01); *F16D 48/08* (2013.01); *B60Y 2200/92* (2013.01); *B60Y 2300/182* (2013.01); *B60Y 2300/18125* (2013.01); *B60Y 2300/427* (2013.01); *B60Y 2300/43* (2013.01); *B60Y 2300/60* (2013.01); *B60Y 2400/42* (2013.01); *B60Y 2400/60* (2013.01); *Y10S 903/906* (2013.01); *Y10S 903/914* (2013.01); *Y10S 903/93* (2013.01); *Y10S 903/946* (2013.01)

(58) Field of Classification Search
CPC ........ B60W 20/13; B60W 10/02; F16D 48/08
USPC .......................................................... 701/22
See application file for complete search history.

(56) References Cited

U.S. PATENT DOCUMENTS

| | | | |
|---|---|---|---|
| 8,113,309 B2* | 2/2012 | Allgaier ................... | B60K 6/48 180/65.25 |
| 2016/0075321 A1* | 3/2016 | Hodrus ................. | B60W 20/00 701/22 |

FOREIGN PATENT DOCUMENTS

| | | |
|---|---|---|
| JP | 2008-151328 A | 7/2008 |
| JP | 2008-256189 A | 10/2008 |

(Continued)

*Primary Examiner* — Tan Q Nguyen
(74) *Attorney, Agent, or Firm* — McDermott Will & Emery LLP

(57) ABSTRACT

A method for learning a touch point of an engine clutch for a hybrid electric vehicle includes controlling a speed of an engine to have an idle speed. A fluid pipe of a clutch actuator is refilled with a working fluid by driving a driving motor in an idle control state of the engine, a speed of the driving motor is synchronized with the speed of the engine, and then the engine clutch is engaged. The engine clutch is released after the refill is performed, and the speed of the driving motor is decreased. A working fluid is applied so that the engine clutch is operated in an engagement direction by operating the clutch actuator, and a state change of the driving motor is detected. The touch point of the engine clutch is determined based on the state change of the driving motor.

6 Claims, 4 Drawing Sheets

(51) Int. Cl.
*B60W 10/06* (2006.01)
*B60W 10/08* (2006.01)

(56) References Cited

FOREIGN PATENT DOCUMENTS

| | | |
|---|---|---|
| JP | 2011-161982 A | 8/2011 |
| JP | 2012-052618 A | 3/2012 |
| JP | 5026392 B2 | 9/2012 |
| JP | 2013-035403 A | 2/2013 |
| JP | 2013-072521 A | 4/2013 |
| JP | 2014-051266 A | 3/2014 |
| KR | 10-1371461 B1 | 3/2014 |
| WO | 2014/158888 A1 | 10/2014 |

* cited by examiner

-- Related Art --

-- Related Art --

-- Related Art --

METHOD FOR LEARNING TOUCH POINT OF ENGINE CLUTCH FOR HYBRID ELECTRIC VEHICLE

CROSS-REFERENCE TO RELATED APPLICATION

This application claims under 35 U.S.C. §119(a) the benefit of priority to Korean Patent Application No. 10-2015-0069409 filed on May 19, 2015, the entire content of which is incorporated herein by reference.

TECHNICAL FIELD

The present disclosure relates to a method for learning a touch point of an engine clutch for a hybrid electric vehicle. More particularly, the present disclosure relates to a method for learning a touch point of an engine clutch for a hybrid electric vehicle, in which the touch point that is a start position of torque transmission in a dry clutch may be accurately estimated and learned.

BACKGROUND

Due to increasing demands for improvement of fuel efficiency and enhanced regulation of exhaust gas, an environmentally-friendly vehicle, such as a hybrid electric vehicle, has been developed.

A general hybrid electric vehicle combines an engine and a motor as driving sources, and uses fossil fuel energy and electrical energy for travelling, thus decreasing exhaust gas and improving fuel efficiency.

FIG. 1 schematically illustrates a power train of a transmission mounted electric device in which a driving motor 3 and a transmission 4 are mounted in a hybrid electric vehicle.

As illustrated in FIG. 1, an engine 1 and the driving motor 3, which serve as driving sources for driving the vehicle, are serially connected. The transmission 4 is connected to an output side of the driving motor 3 to shift power of the engine 1 and the driving motor 3 and to transmit the shifted power to a driving shaft of the hybrid electric vehicle.

An integrated starter and generator (ISG) 5, which starts the engine 1 or performs power generation with the power transmitted from the engine, is connected to the engine 1 to transfer the power.

A battery (not illustrated), which serves as a power source of the driving motor 3 and the ISG 5, is chargeable/dischargeable connected to the driving motor 3 and the ISG 5 through an inverter (not illustrated), and the inverter converts a direct current of the battery into a three-phase alternating current and applies the three-phase alternating current for driving the driving motor 3 and the ISG 5.

An engine clutch 2 is disposed between the engine 1 and the driving motor 3 and selectively blocks power between the engine 1 and the driving motor 3.

The engine clutch 2 selectively connects or blocks the power between the engine 1 and the driving motor 3 through an engagement (lockup) operation and a release (open) operation by an actuator (not shown).

The engine clutch 2 may be divided into a wet clutch and a dry clutch, and the actuator is controlled according to a control signal of an engine control unit (ECU), so that the engine clutch 2 is engaged or released.

In the hybrid electric vehicle as described above, a travel mode is selected according to an operation condition, and the hybrid electric vehicle travels in an electric vehicle (EV) mode that is a pure electric vehicle mode using only power of the driving motor 3 or in a hybrid electric vehicle (HEV) mode using power of the engine 1 and power of the driving motor 3 together.

When the vehicle brakes or coasts by inertia, a regenerative mode for collecting brake and inertia energy through power generation of the driving motor 3 and charging the battery is performed.

The ISG 5 is operated as a power generator by the power of the engine 1 itself or a power generator by a rotary force transmitted through the engine under a regenerative condition to charge the battery.

In the hybrid electric vehicle, the engine clutch is engaged or released according to acceleration/deceleration by driver's manipulation of an acceleration pedal and a brake pedal, loads, a vehicle speed, a state of charge (SOC) of the battery, and the like, so that the hybrid electric vehicle travels in the HEV mode or the EV mode.

When the EV mode is shifted to the HEV mode while driving, the engine clutch is engaged after an engine speed is synchronized with a speed of the driving motor, so that a torque does not vary during a power transmission process between the engine and the driving motor, thereby securing operability.

More particularly, when the EV mode is shifted to the HEV mode, when a difference between speeds of each terminal of the engine clutch, that is, a speed of the engine and a speed of the driving motor, enters a predetermined speed difference by controlling the speeds of each terminal of the engine clutch after cranking of the engine by the ISG, the engine clutch slips.

Next, when a predetermined time elapses after the slip control of the engine clutch starts, it is determined that the speed of the engine and the speed of the driving motor are synchronized and the engine clutch is completely engaged, thereby completing the shift from the EV mode to the HEV mode.

A position (torque transmission start point) at which friction surfaces (clutch surfaces) of both ends of the engine clutch are in contact with each other and the torque transmission start point, that is, a position of a contact point at which the engine clutch starts to be in a slip state, is referred to as a touch point (or a kiss point (KP)) of the engine clutch.

In transmitting power of the engine to a wheel (motor) through the clutch slip by the general engine clutch, it is important to accurately recognize the touch point that is the start position of the transmission of power of the engine through the clutch and to accurately detect, by the ECU, a physical transmission quantity of the transmission torque of the engine clutch.

A general hybrid system introduces engine clutch learning control, and engine clutch learning may generally be divided into touch point learning and engine clutch transmission torque learning.

The touch point learning is learning of searching for a position of an actuator (a stroke position of a piston to be described below) at a start time point of the power transmission in the dry clutch, and when the touch point is incorrectly learned, an undesired transmission torque is generated, so that a difference sense may be generated. When an offset is large, a control response property of the clutch may deteriorate.

Engine clutch performance may vary according to progress of abrasion of the contacted friction surfaces. When abrasion of the engine clutch progresses, a clamping load and a release load are increased, and the touch point of the clutch is also changed according to an abrasion state.

Accordingly, when the touch point is not learned, a force may be applied on the friction surfaces before the clutch reaches an actual touch point, and an undesired clutch transmission torque and a difference sense may be generated.

When a difference between a learning value and an actual touch point is large, a clutch control response property may deteriorate, such that it is necessary to accurately and continuously learn the touch point in order to accurately control a transmission torque of the clutch.

Particularly, the dry clutch has a larger abrasion degree and higher importance of learning of the touch point than the wet clutch, and in order to properly learn the touch point, as illustrated in FIG. 2, it is necessary to decrease an influence of a temperature using a fluid.

In an actuator which operates an engine clutch by using a working fluid as illustrated in FIG. 2, when a motor 12 is driven according to a command of an engine control unit 11, a rotary force of a screw shaft 13 is converted into a straight force and transmitted to a piston 14, and a pressure of the working fluid supplied to the engine clutch 2 is controlled while the piston 14 moves forward or backward to control the piston 14.

A travel sensor 16 for detecting a stroke position of the piston 14 and a pressure sensor 17 for detecting pressure of a working fluid are installed at a master cylinder 15.

When learning a touch point, the engine control unit 11 determines a start time point of a torque transmission of the engine clutch 2, and then stores a value of the stroke position of the piston 14 detected by the travel sensor 16 at the start time point in a memory as a touch point value (final learning value).

A system of FIG. 2 includes a slave cylinder 19 receiving pressure of the working fluid from the master cylinder 15 and applying a force to the engine clutch 2, and a fluid pipe 18 is connected between the master cylinder 15 and the slave cylinder 19 so that the fluid pipe 18 is filled with the working fluid to transmit a pressure of the working fluid.

As described above, the force for operating the engine clutch 2 is transmitted through the fluid filled inside the fluid pipe 18, so that in order to increase accuracy of a touch point learning value, it is necessary to remove a temperature influence on the fluid.

Accordingly, a refill control for fully filling the fluid pipe 18 with a fluid may be performed before the touch point learning of the engine clutch is performed so that a temperature influence may be removed.

When the piston 14 of the master cylinder 15 completely pushes the fluid, the fluid pipe may be fully filled with the fluid, so that the refill control may be performed in a state where the engine clutch 2 is completely engaged.

That is, the refill control for fully filling the fluid pipe 18 with the fluid in a state where the pistons 14 and 20 of the actuator move a stroke so that the engine clutch 2 is completely engaged may be performed.

FIG. 3 is a diagram illustrating a comparison between touch point values before and after a refill control, and A represents a stroke position value of the piston 14, and ① represents a piston stroke position value at the time of learning of a touch point at which the engine clutch 2 is slightly engaged and then released until a contact between friction surfaces starts (until a torque transmission starts) in order to calculate a touch point value, and ② represents a piston stroke positon value when the engine clutch 2 is completely engaged and a refill control for filling the fluid pipe 18 with the fluid is performed.

A-1 represents a piston stroke positon value at the time of the learning for obtaining a touch point value in a state where the refill control is not performed, and A-2 represents a piston stroke positon value at the time of the learning for obtaining a touch point value when the engine clutch 2 is completely engaged and the refill control is performed.

B represents a touch point value, B-1 represents a touch point value obtained in the state where the refill control is not performed, and B-2 represents a touch point value obtained in the state where the engine clutch is engaged and the refill control is performed.

As described above, in comparison between the case where the refill control is performed and the case where the refill control is not performed, a difference in the touch point value is large, and a difference in a transmission torque is several tens of Nm, so that the difference in the transmission torque greatly influences operability.

Accordingly, in order to accurately obtain a touch point value and improve accuracy of the touch point learning, the engagement of the engine clutch and the refill control indicated by ② may be performed before the learning of the touch point indicated by ① is executed.

However, in the related art, the touch point is learned at a P position of a gear shift stage that is before the vehicle starts, and subsequently the refill control is performed when the engine clutch 2 is engaged after a vehicle starts running, so that the fluid pipe 18 may not be filled with the fluid at the time of the learning of the touch point before the vehicle starts.

Particularly, when the refill control is performed while the vehicle travels, the vehicle is operated again long after the operation of the vehicle is ended, and the touch point learning process is performed before the vehicle starts, it cannot be determined whether the fluid pipe is refilled with the fluid at the time of the learning. A fluid state within the fluid pipe at the time of a re-start of the operation after a long time has passed may be similar to a state where the refill is not performed.

Accordingly, the touch point value obtained after the learning and the transmission torque of the engine clutch after the learning exhibits large differences similar to the difference between the case where the refill is performed and the case where the refill is not performed as illustrated in FIG. 3.

Accordingly, there exists for an improved touch point learning method.

The above information disclosed in this Background section is only for enhancement of understanding of the background of the invention, and therefore, it may contain information that does not form the prior art that is already known in this country to a person of ordinary skill in the art.

SUMMARY OF THE DISCLOSURE

The present disclosure has been made in an effort to solve the above-described problems associated with prior art.

The present disclosure provides a touch point learning method for an engine clutch of a hybrid electric vehicle, which changes a refill time point and a touch point learning time point, thereby accurately estimating and learning a touch point that is a start position of a torque transmission.

According to an exemplary embodiment of the present inventive concept, a method for learning a touch point of an engine clutch for a hybrid electric vehicle includes controlling a speed of an engine to have an idle speed. A fluid pipe of a clutch actuator is refilled with a working fluid by driving a driving motor in an idle control state of the engine, a speed of the driving motor is synchronized with the speed of the engine, and then the engine clutch is engaged. The engine clutch is released after the refill is performed, and the speed of the driving motor is decreased. A working fluid is applied so that the engine clutch is operated in an engagement direction by operating the clutch actuator, and a state change of the driving motor is detected. A touch point of the engine clutch is determined based on the state change of the driving motor.

When a value of a state of charge (SOC) of a battery is equal to or smaller than a reference value so that the engine is driven for charging the battery, the steps for learning the touch point of the engine clutch may be performed.

When a temperature of the engine is equal to or lower than a reference temperature so that the engine is driven for warming up the engine, the steps for learning the touch point of the engine clutch may be performed.

The step of detecting the state change of the driving motor may include maintaining the idle control state of the engine.

The step of detecting the state change of the driving motor may include detecting a torque change of the driving motor.

In the step of detecting the state change of the driving motor, a touch point in a case where a torque variation value of the driving motor is equal to or larger than a set value may be stored as a learning value.

According to the touch point learning method of a hybrid electric vehicle of the present disclosure, the engine and the driving motor are controlled to have an idle speed and are synchronized, the engine clutch is engaged and the fluid pipe is refilled, and then the engine clutch is engaged again after the engine clutch is released in a state where the speed of the driving motor is decreased to update a start position of a torque transmission as a new touch point, so that it is possible to more accurately estimate and learn the touch point in a state where a completely fluid refilled state is secured.

In the present disclosure, uncomfortable driving is prevented during the refill process and the learning process, so that it is possible to improve operability while learning the touch point.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Hereinafter reference will now be made in detail to various embodiments of the present inventive concept, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents, and other embodiments, which may be included within the spirit and scope of the invention as defined by the appended claims.

Hereinafter, an exemplary embodiment of the present inventive concept will be described in detail with reference to the accompanying drawings so that those with ordinary skill in the art to which the present disclosure pertains may easily carry out the exemplary embodiment.

The present disclosure provides a touch point learning method for an engine clutch of a hybrid electric vehicle, which changes a refill time point and a touch point learning time point, thereby accurately estimating and learning a touch point that is a start position of a torque transmission.

An aspect of the present inventive concept is to synchronize a speed of an engine and a speed of a driving motor by controlling the engine and the driving motor to have an idle speed, perform engagement of an engine clutch and refill of a fluid pipe, engage the engine clutch again in a state where the speed of the driving motor is decreased after the engine clutch is released, and update a start position of a torque transmission as a new touch point.

The touch point learning method of the present disclosure may be usefully applied as a learning method of a dry clutch widely applied to a parallel hybrid electric vehicle.

Figure 4:
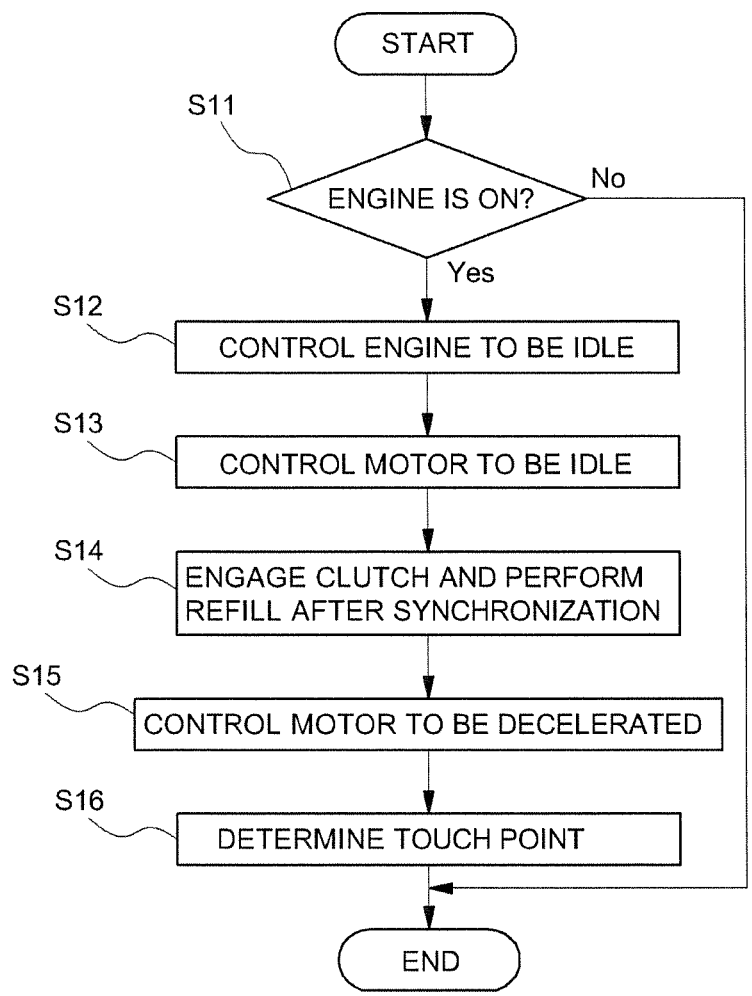
FIG. 4 is a flowchart illustrating a touch point learning process according to the present disclosure.
Figure 5:
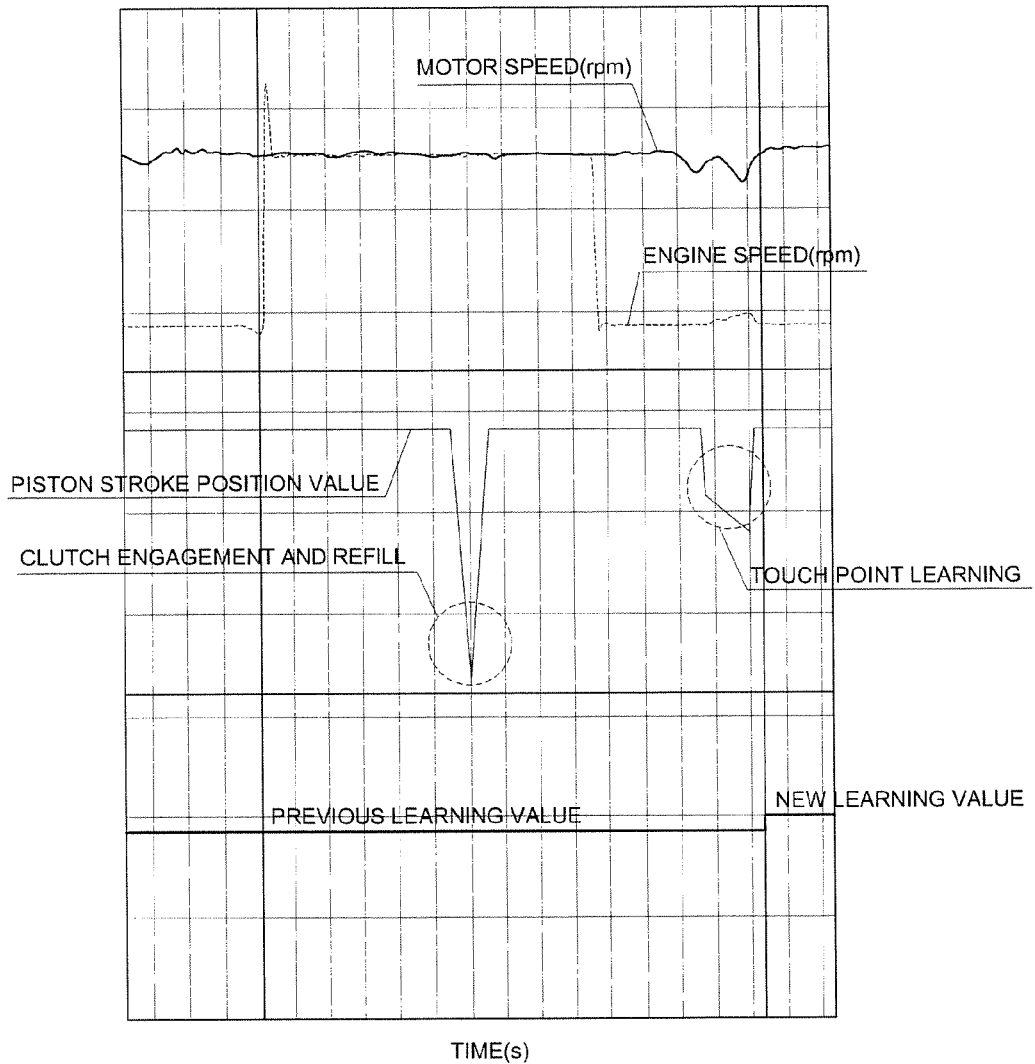
FIG. 5 is a diagram illustrating an example of an engine speed, a motor speed, a stroke position value, and a touch point learning value during the touch point learning process according to the present disclosure.

FIG. 4 is a flowchart illustrating a touch point learning process according to the present disclosure, and FIG. 5 is a diagram illustrating an example of an engine speed, a motor speed, a stroke position value, and a touch point learning value during the touch point learning process according to the present disclosure.

Figure 1:
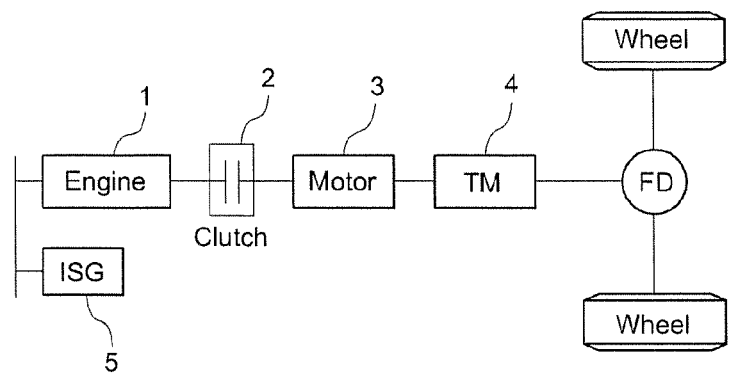
FIG. 1 is a diagram schematically illustrating a power train of a hybrid electric vehicle according to the related art.
Figure 2:
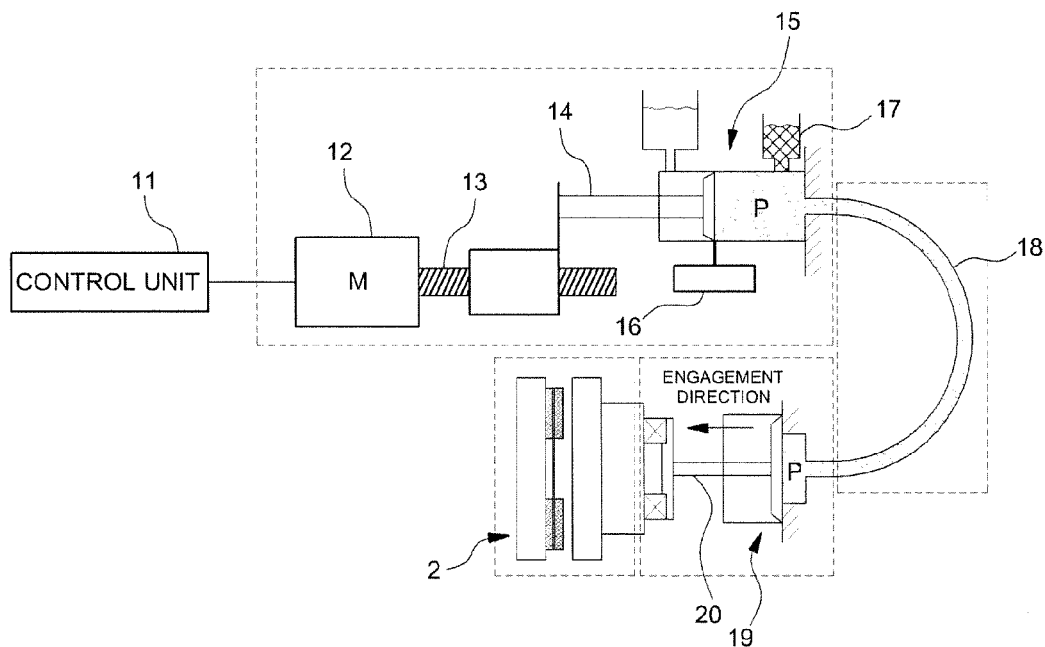
FIG. 2 is a diagram schematically illustrating a dry clutch and an actuator for driving the clutch according to the related art.
Figure 3:
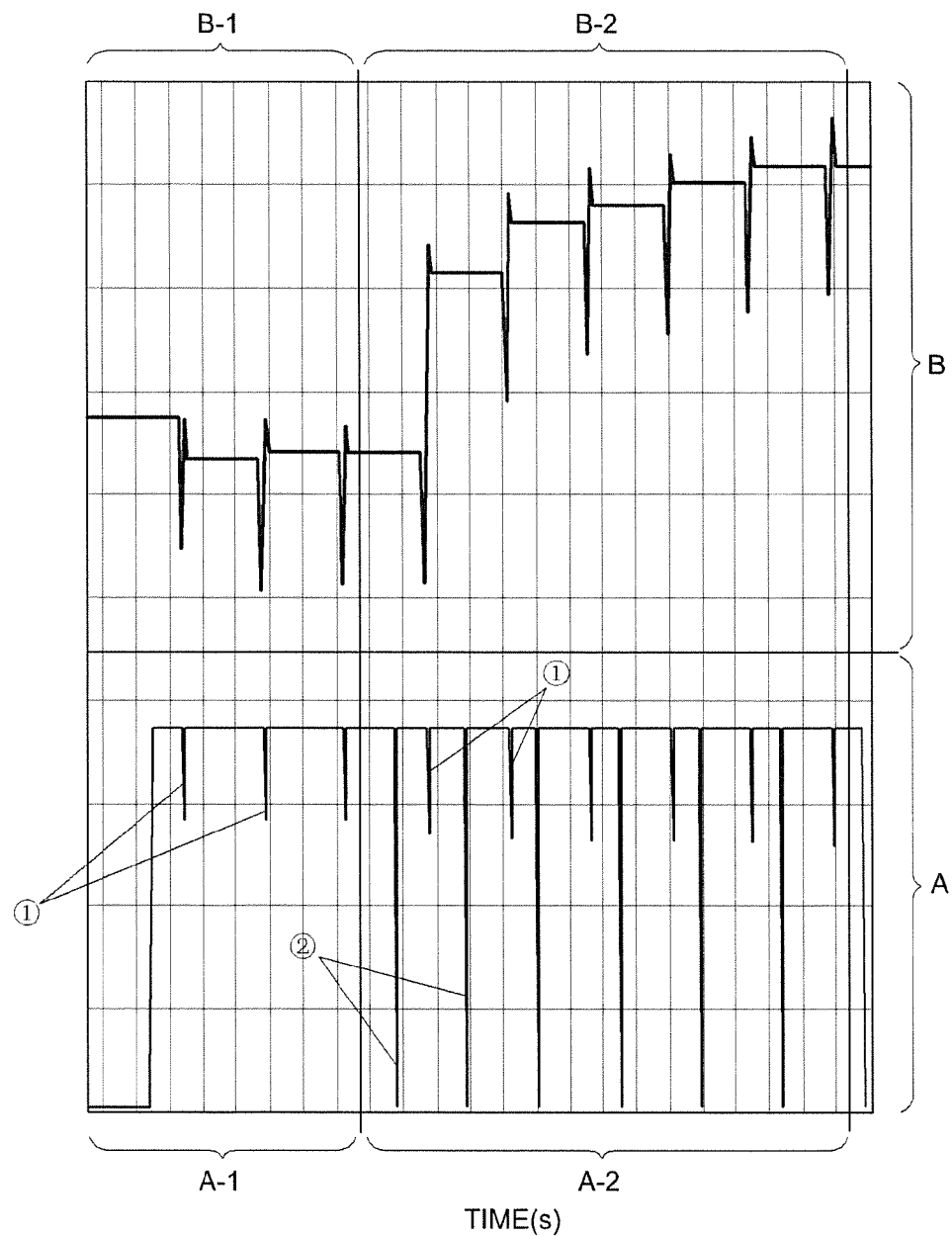
FIG. 3 is a diagram for describing a problem in the related art.

A power train of a hybrid electric vehicle including an engine 1, an engine clutch 2, a driving motor 3, and a transmission 4 described below will be referred to FIG. 1, and an actuator for operating the engine clutch 2 will be referred to FIG. 2.

In FIG. 5, a stroke position value represents a stroke position value of a piston 14 installed at a master cylinder 15 of the actuator of the engine clutch, and may be detected by a travel sensor 16 installed at the master cylinder 15.

A touch point learning value represents a previous learning value stored in a memory and a newly updated learning value, and the learning value is a piston stroke position (torque transmission start point) value detected by the travel sensor 16 when both ends of the engine clutch are in contact so that the torque transmission starts, and a touch point value obtained whenever the touch point learning process is performed is stored as a learning value in the memory and updated.

When a refill process and the touch point learning process are continuously performed by simply rotating the driving motor and operating the actuator and the engine clutch 2 while the engine is driven for travelling of the vehicle, a driver may feel uncomfortable.

Accordingly, the refill process and the touch point learning process may be set to be performed when the engine is driven for other reasons, not for the purpose of the travelling of the vehicle.

For example, a driving state of the engine in which the refill process and the touch point learning process are performed may be a case where the engine is driven for charging a battery because a value of a state of charge (SOC) of the battery is equal to or smaller than a reference value, or a case where the engine is driven for warming up the engine because a temperature of the engine is equal to or lower than a reference temperature.

According to the present disclosure, when the engine 1 is driven due to a low SOC of the battery, a low temperature of the engine, or the like, an engine control unit 11 first controls the engine to have an idle speed for learning a touch point.

Then, when the engine 1 enters an idle control state, the driving motor 3 is also driven at the same speed as that of the engine to be in an idle state.

In general, in order to learn the touch point, the driving motor 3 needs to rotate, and a high frequency noise is generated when the driving motor rotates. However, the engine 1 and the driving motor 3 are driven together, so that the high frequency noise of the driving motor is not heard due to an engine noise.

Next, when the speed of the engine and the speed of the driving motor are controlled to be the same and then are synchronized as described above, the engine clutch 2 is engaged, and the refill process for completely filling the fluid pipe 18 with a fluid is performed.

In this case, a pressure of a working fluid is transmitted to a slave cylinder 19 by moving the piston 14 of the master cylinder 15 forwardly, and a piston 20 of the slave cylinder 19 moves forward by the transmitted pressure of the working fluid, so that friction surfaces of the engine clutch 2 are engaged.

As a matter of course, a piston stroke position of the master cylinder 15 is controlled so that the fluid pipe 18 becomes a refilled state in which the fluid pipe 18 is completely filled with the fluid.

When the engagement of the engine clutch 2 and the refill are performed as described, the engine clutch is released, and in this case, in order to release the engine clutch, the piston 14 of the master cylinder 15 moves backward.

Subsequently, the speed of the driving motor 3 is decreased to a rotational speed, at which a torque may be detected, during the idle control of the engine 1, and a change time point of a motor torque is searched by slowly operating the engine clutch 2 in an engagement direction to determine and learn thd touch point.

When the driving motor 3 rotates at a minimum specific speed (for example, 500 rpm) or more at the time of the learning of the touch point, a torque may be accurately detected, and the engine clutch 2 is slowly operated in the engagement direction by applying a pressure of the working fluid to the slave cylinder 19 by moving the piston 14 of the master cylinder 15 forwardly and moving the piston 20 of the slave cylinder 19 forwardly with the pressure of the working fluid applied to the slave cylinder 19.

Here, a state change of the driving motor 3 is detected, and the touch point of the engine clutch 2 is determined based on the state change of the driving motor 3. When a torque variation value of the driving motor is equal to or larger than a set value, a piston stroke position value at this time is determined as a new touch point and is stored in the memory.

When the new touch point is determined and the touch point learning process is performed as described above, the engine clutch 2 is then controlled by using the learning value.

As described above, in the related art, a refill state of a fluid within a fluid pipe is be determined before a touch point is learned, but in the present disclosure, it is possible to accurately estimate and learn a touch point based on a completely refilled state of the fluid through the control process.

In the present disclosure, any driving uncomfortableness is not incurred to a driver during the refill process and the touch point learning process, so that it is possible to improve operability when the touch point learning process is performed.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of learning a touch point for an engine clutch of a hybrid electric vehicle, the method comprising steps of:
controlling a speed of an engine to be an idle speed;
refilling a fluid pipe of a clutch actuator with a working fluid by driving a driving motor in an idle control state of the engine, synchronizing a speed of the driving motor with the speed of the engine, and then engaging the engine clutch;
releasing the engine clutch after the step of refilling and decreasing the speed of the driving motor;
applying the working fluid to operate the engine clutch in an engagement direction by operating the clutch actuator and detecting a state change of the driving motor; and
determining the touch point of the engine clutch based on the state change of the driving motor.

2. The method of claim 1, wherein when a value of a state of charge (SOC) of a battery is equal to or smaller than a reference value so that the engine is driven for charging the battery, the method for learning the touch point of the engine clutch is performed.

3. The method of claim 1, wherein when a temperature of the engine is equal to or lower than a reference temperature, the engine is driven for warming up the engine and the steps for learning the touch point of the engine clutch are performed.

4. The method of claim 1, wherein the step of detecting the state change of the driving motor includes maintaining the idle control state of the engine.

5. The method of claim 1, wherein the step of detecting the state change of the driving motor includes detecting a torque change of the driving motor.

6. The method of claim 5, wherein in the step of detecting the state change of the driving motor, the touch point is stored as a learning value when a torque variation value of the driving motor is equal to or larger than a set value.

\* \* \* \* \*